US011301354B2

(12) United States Patent
Raghavan et al.

(10) Patent No.: US 11,301,354 B2
(45) Date of Patent: Apr. 12, 2022

(54) ROOT CAUSE DISCOVERY SYSTEM

(71) Applicant: Microsoft Technology Licensing, LLC, Redmond, WA (US)

(72) Inventors: Ananthatejas Raghavan, Bothell, WA (US); Di Li, Bellevue, WA (US); Anil Kumar Revuru, Sammamish, WA (US); Dheepak Ramaswamy, Seattle, WA (US); Leanna Holly Robb, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 16/597,218

(22) Filed: Oct. 9, 2019

(65) Prior Publication Data
US 2021/0109835 A1 Apr. 15, 2021

(51) Int. Cl.
G06F 9/44 (2018.01)
G06F 11/34 (2006.01)
G06F 11/30 (2006.01)

(52) U.S. Cl.
CPC ........ *G06F 11/3438* (2013.01); *G06F 11/302* (2013.01); *G06F 11/3006* (2013.01)

(58) Field of Classification Search
None
See application file for complete search history.

(56) References Cited

U.S. PATENT DOCUMENTS

| | | | | |
|---|---|---|---|---|
| 2007/0294591 | A1* | 12/2007 | Usynin | G06F 11/0748 714/45 |
| 2017/0310546 | A1* | 10/2017 | Nair | H04L 41/0654 |
| 2018/0375892 | A1* | 12/2018 | Ganor | G06F 3/04847 |
| 2019/0286725 | A1* | 9/2019 | Gawlick | G06F 11/3072 |
| 2021/0073658 | A1* | 3/2021 | Poole | G06F 11/328 |
| 2021/0073693 | A1* | 3/2021 | Vij | G06F 16/26 |

* cited by examiner

*Primary Examiner* — Qamrun N Nahar
(74) *Attorney, Agent, or Firm* — Schwegman Lundberg & Woessner, P.A.

(57) ABSTRACT

A system and method for determining enterprise metrics of an enterprise application is described. The system receives a root cause definition that identifies enterprise user metrics and predefined parameters for the enterprise user metrics. The enterprise user metrics identify operation metrics of the enterprise application by users of the enterprise. The system stores the root cause definition in a library of root causes definitions. The system receives a selection of a plan that identifies an operation attribute of the enterprise application. The system identifies a root cause from the library of root causes definitions based on the plan. The system generates a recommendation based on the identified root cause.

19 Claims, 10 Drawing Sheets

ROOT CAUSE DISCOVERY SYSTEM

BACKGROUND

The subject matter disclosed herein generally relates to a special-purpose machine that computes enterprise performance metrics, including computerized variants of such special-purpose machines and improvements to such variants. Specifically, the present disclosure addresses systems and methods for identifying a root cause based on user-provided root cause definitions for measuring enterprise metrics of an enterprise application.

Measuring a performance of user's operations of an enterprise application can be difficult to determine given the millions of data point entries and the lack of context of computed metrics. Furthermore, the effectiveness and accuracy of human-driven analysis of large sets of data is increasingly low compared to machine-driven analysis. For example, if an organization needs a time sensitive analysis of a data set that has millions of entries across hundreds of variables, no human could perform such an analysis by hand or mentally. Furthermore, any such analysis may be out-of-date almost immediately, should an update be required.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
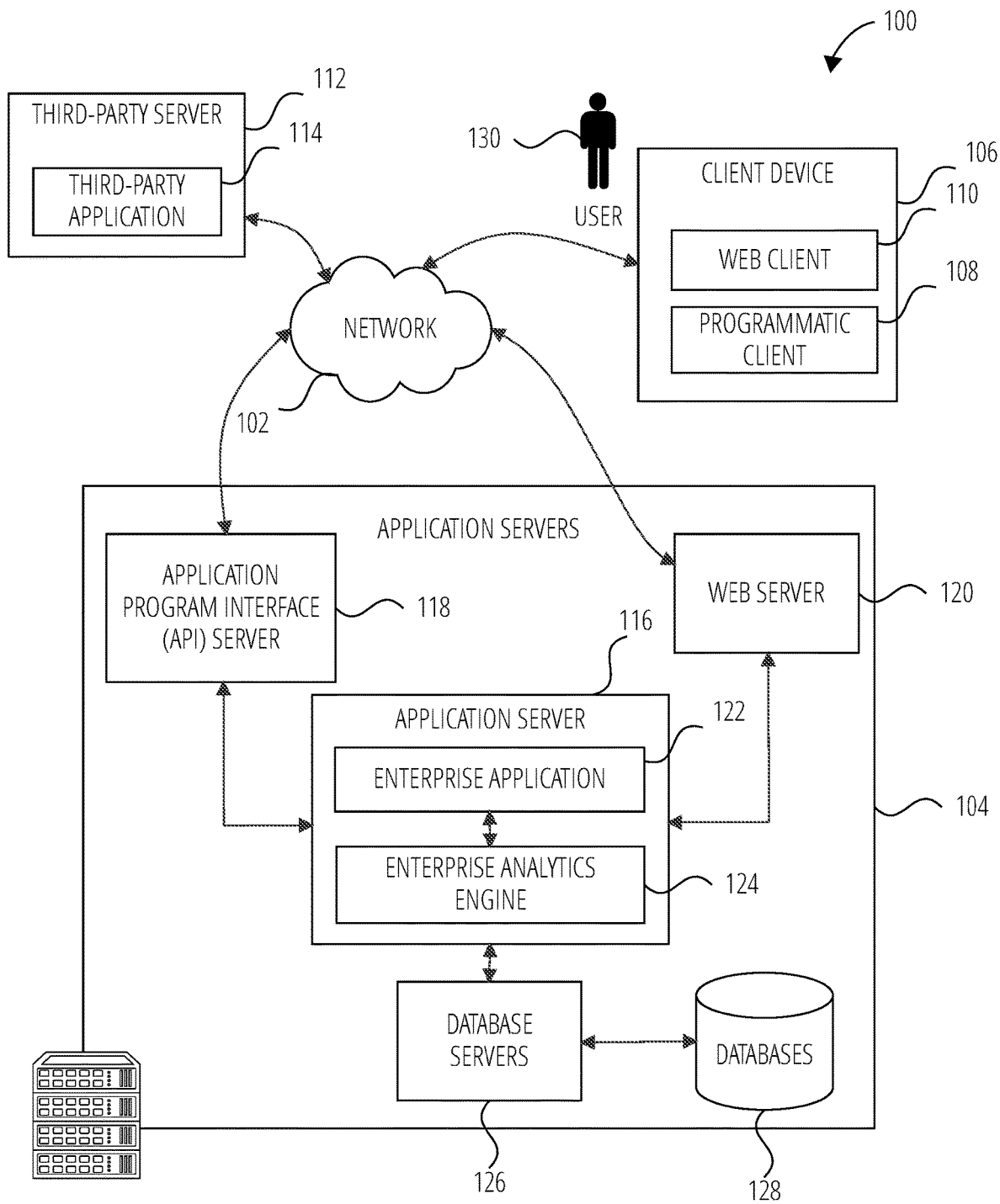
FIG. 1 is a diagrammatic representation of a networked environment in which the present disclosure may be deployed, in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a method for computing a performance of an enterprise application. An enterprise represents organizations or groups of users associated with an organization. In particular, the system provides algorithms to calculate the performance of user operations of the enterprise application by users from the enterprise. The system determines anomalous user operations of the enterprise application by identifying an enterprise user group (also referred to as an active group, a selected group, or a selected enterprise user group) with metrics data that indicate a trait of the enterprise user group can be improved relative to peer enterprise user group (also referred to as a control group, or a control enterprise user group). Examples of user operations of the enterprise application are, but not limited to, time of operation, frequency of operation, period of operation, types of operations such as emails, chats, group communication, and document sharing.

The analysis of user operations of enterprise applications to identify a user group typically involves an administrator or an analyst. The analyst manually is provided with a variety of metrics that tracks the performance of the enterprise application and identifies a group of users based on the variety of metrics. The manual identification of the user group using a multitude of data points and metrics increases the complexity of the analysis.

The present application provides a framework to support automated analysis for root causes and to generate a suggestion or recommendation based on various kinds of definitions on metrics. The root cause is associated with a corresponding root cause definition. The root cause definition is defined based on the aggregation of selected metrics for an active group against a control group.

A user, administrator, or analyst of the enterprise application provides a root cause definition to the system. The root cause definition includes, for example, an identification of metrics, and filters on the metrics (e.g., boundary parameters for the metrics). For example, a root cause definition for "AfterHoursCollaboration" root cause includes a number of meetings, chats, or emails after hours (e.g., after 5 pm and before 8 am) by users of the enterprise application. Once the root cause definition is created, the root cause definition is provided to a database of the system (e.g., a library of root cause definitions). An analytics service (e.g., Azure Analysis Services of Microsoft™) accesses the library of root cause definition to process the metrics associated with the root cause definitions. For example, a client device can query the analytics service to request different insights (e.g., analytics) based on any combination of metrics. The library of root causes enables users to perform various kinds of analysis.

A user of the enterprise application selects a plan to be used. For example, the plan identifies an operation attribute (e.g., reduce after-hours operations) of the enterprise application. Other examples of operation attributes include, but are not limited to, increase time of focus, and reduce meetings not conducive to decision-making (e.g., fewer meetings with less than 8 attendees, and fewer meetings that each last more than one hour). In another example, a "plan"

includes include a method for achieving an end goal (examples of which are listed above) with assistance from enterprise tools specifically designed to achieve the end goals. For example, a user enrolled in a plan to achieve reduction in after-hours collaboration obtains assistance in the following ways: the plan helps participants avoid after-hours interactions; the plan gives participants tips and insights to help them have more days without meetings, emails, and chats outside of their normal working hours; the plan sends participants a weekly summary of progress.

The system dynamically discovers all kinds of insights applicable to the selected plan by calling an analytics service of the enterprise application (e.g., insight discovery service). The Insight Discovery Service is responsible for determining which root causes are applicable for the selected plan. The service uses multiple heuristics (e.g., static mapping, machine learning models) to determine which root causes fit well with the selected plan and would boost a trait of a user group (e.g., a productivity of a user group as measured by metrics defined in the root cause).

Once the system identifies a root cause corresponding to the plan, the system queries the analytics service (e.g., Azure Analysis Services) to compute all possible insights. The insight calculation can be used to showcase root causes for the selected plan or the potential savings the user would obtain by running the selected plan. The insight calculation is performed by computing metrics for a selected active group in comparison to a control group. In one example, the control group is supplied or identified by the user. In another example, the control group is identified by the system as a similar group (e.g., a group having similar characteristics of the selected active group). In one example, similar characteristics include sharing one features of a characteristic (e.g., group size, department, employee seniority level).

The system determines that the root cause is applicable when the system determines that the calculation obtained is a trait which can be improved upon. For example, for focus hours (e.g., hours that the user has reserved on his/her calendar for personal tasks), the system determines whether the user has less focus hours than the number of focus hours from a control group. The system then identifies that the focus hours is considered a trait to be improved upon. In another example, for meeting hours, the system determines whether the user has a higher number of meeting hours than the number of meeting hours from the control group. The system then identifies that the number of meeting hours is considered a trait to be improved upon. The present system enables a user to determine if a plan is applicable to the enterprise by just a click of a button instead of analyzing a whole set of metrics.

Once the plan is created on identification of the root causes or savings, the system can generate reminders or suggestions to the users to nudge them to modify their usage operations of the enterprise application (e.g., reducing emails after hours). For example, if the system determines that "AfterHoursCollaboration" root cause is found to be one of the top root causes, the system communicates with the enterprise application (or another linked or connected enterprise application) to nudge the user not to send emails while they compose emails on the enterprise email application after work hours. In another example, the system communicates with the enterprise email application to email the user an email every week to remind the user that they are in the corresponding plan. In another example, the system communicates with an enterprise chat application to inform the user that it would boost their productivity by not collaborating post work hours.

In another example, the system generates a graphical user interface that includes graphs and illustrates the metrics of a control group relative to peer groups based on the root cause definition and the selected plan. Examples of root metrics include number of emails after hours, frequency of emails after hours, meetings after hours, focus hours during a workday.

In one example embodiment, a system and method for determining enterprise metrics of an enterprise application is described. The system receives a root cause definition that identifies enterprise users' metrics and predefined parameters for the enterprise users' metrics. The enterprise user metrics identify operation metrics of the enterprise application by users of the enterprise. The system stores the root cause definition in a library of root causes definitions. The system receives a selection of a plan that identifies an operation attribute of the enterprise application. The system identifies a root cause from the library of root causes definitions based on the plan. The system generates a recommendation based on the identified root cause.

The present application describes a system that saves the user from manually performing a complex analysis to determine what can be improved in enterprise user groups. The system provides a flexible framework that allows both the user and the enterprise to define root cause identification definitions. The system helps in identifying the related definitions for a given type of plan dynamically so that only the applicable root causes is shown as per the definition of a plan. For example, if a plan is related to meetings, the system does not recommend root causes related to chats. The system also allows for the user to keep the root cause definition private or allows others to make use of their root cause definitions.

As a result, one or more of the methodologies described herein facilitate solving the technical problem of determining enterprise metrics of an enterprise application. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser), a programmatic client 108 (e.g., an email/calendar application such as Microsoft Outlook™, an instant message application, a document writing application, a shared document storage application) that is hosted and executed on the client device 106. In one example embodiment, the programmatic client 108 logs operation data (e.g., enterprise application usage metadata) from the web client 110 and the programmatic client 108 with the enterprise application 122. In another example embodiment, the enterprise application 122 logs operation data between the web client 110, the programmatic client 108, and the enterprise application 122.

The operation data may include operations performed with a combination of the web client 110, the programmatic client 108, and the enterprise application 122. Examples of operation data include such as dates, times, and frequency of communications (e.g., emails) between users of an enterprise or communications between users of the enterprise and outside users of the enterprise. In another example, the operation data may include, but is not limited to, calendar data, email communications, meeting communications, instant messages, shared document comments, and any communication with a recipient (e.g., a user from or outside the enterprise). In another example, the operation data may include metadata related to calendar data, email communications, meeting communications, instant messages, shared document comments, and any communication with other recipient using the enterprise application 122.

An Application Program Interface (API) server 118 and a web server 120 provide respective programmatic and web interfaces to application servers 104. A specific application server 116 hosts the enterprise application 122 and an enterprise analytics engine 124. Both enterprise application 122 and enterprise analytics engine 124 include components, modules and/or applications.

The enterprise application 122 may include enterprise applications (e.g., a server side email/calendar enterprise application, a server side instant message enterprise application, a document writing enterprise application, a shared document storage enterprise application) that enable users of an enterprise to author, collaborate, and share documents, messages, and other data (e.g., meeting information, common projects) with each other. For example, the user 130 at the client device 106 may access the enterprise application 122 to edit documents that are shared with other users of the same enterprise. In another example, the client device 106 accesses the enterprise application 122 to retrieve or send messages or emails to and from other peer users of the enterprise. Other examples of enterprise application 122 includes enterprise systems, content management systems, and knowledge management systems.

The enterprise analytics engine 124 communicates with the enterprise application 122 and accesses operation data from users of the enterprise application 122. In another example, the enterprise analytics engine 124 communicates with the programmatic client 108 and accesses operation data from the programmatic client 108. In another example, the web client 110 communicates with the enterprise analytics engine 124 and the enterprise application 122 via the programmatic interface provided by the Application Program Interface (API) server 118.

The enterprise analytics engine 124 computes enterprise metrics based the operation data collected by the enterprise application 122, the item web client 110, or the programmatic client 108. The metrics may be associated with a profile of the enterprise (e.g., size of the enterprise, revenues, locations). In another example, the enterprise analytics engine 124 receives a selection of a plan from the user 130. The plan may indicate an operation attribute of the enterprise application 122. For example, the plan may indicate an intention to reduce after hours collaboration.

The enterprise analytics engine 124 receives a root cause definition from the client device 106 of the user 130. The enterprise analytics engine 124 identifies metrics data from the operation data based on the root cause definition. The enterprise analytics engine 124 stores the root cause definitions in a root cause library at databases 128. In another example, the enterprise analytics engine 124 determines a root cause corresponding to the selected plan. The enterprise analytics engine 124 compares metrics between an active group and a control group (e.g., peer enterprise user group) based on the metrics defined in the root cause definition corresponding to the selected plan. The enterprise analytics engine 124 identifies a trait of the active group that can be modified or improved based on the comparison. The enterprise analytics engine 124 generates a recommendation or suggestion to the users of the active group and provides reminders and instructions on how to improve the trait.

In another example, the enterprise analytics engine 124 generates a graphical user interface (GUI) that presents the metrics of the active group relative to the metrics of the control group. The GUI includes graphs that illustrate the relationship between the indexes (e.g., metrics) of the active group and the indexes (e.g., metrics) of the control group. In another example, the GUI indicates a recommendation based on the group indexes. The GUI includes a user interactive region that includes the recommendation.

The application server 116 is shown to be communicatively coupled to database servers 126 that facilitates access to an information storage repository or databases 128. In an example embodiment, the databases 128 includes storage devices that store information (e.g., root cause definitions) to be processed by the enterprise application 122 and the enterprise analytics engine 124.

Additionally, a third-party application 114 may, for example, store another part of the enterprise application 122, or include a cloud storage system. For example, the third-party application 114 stores other metrics related to the enterprise application 122. The third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Figure 2:
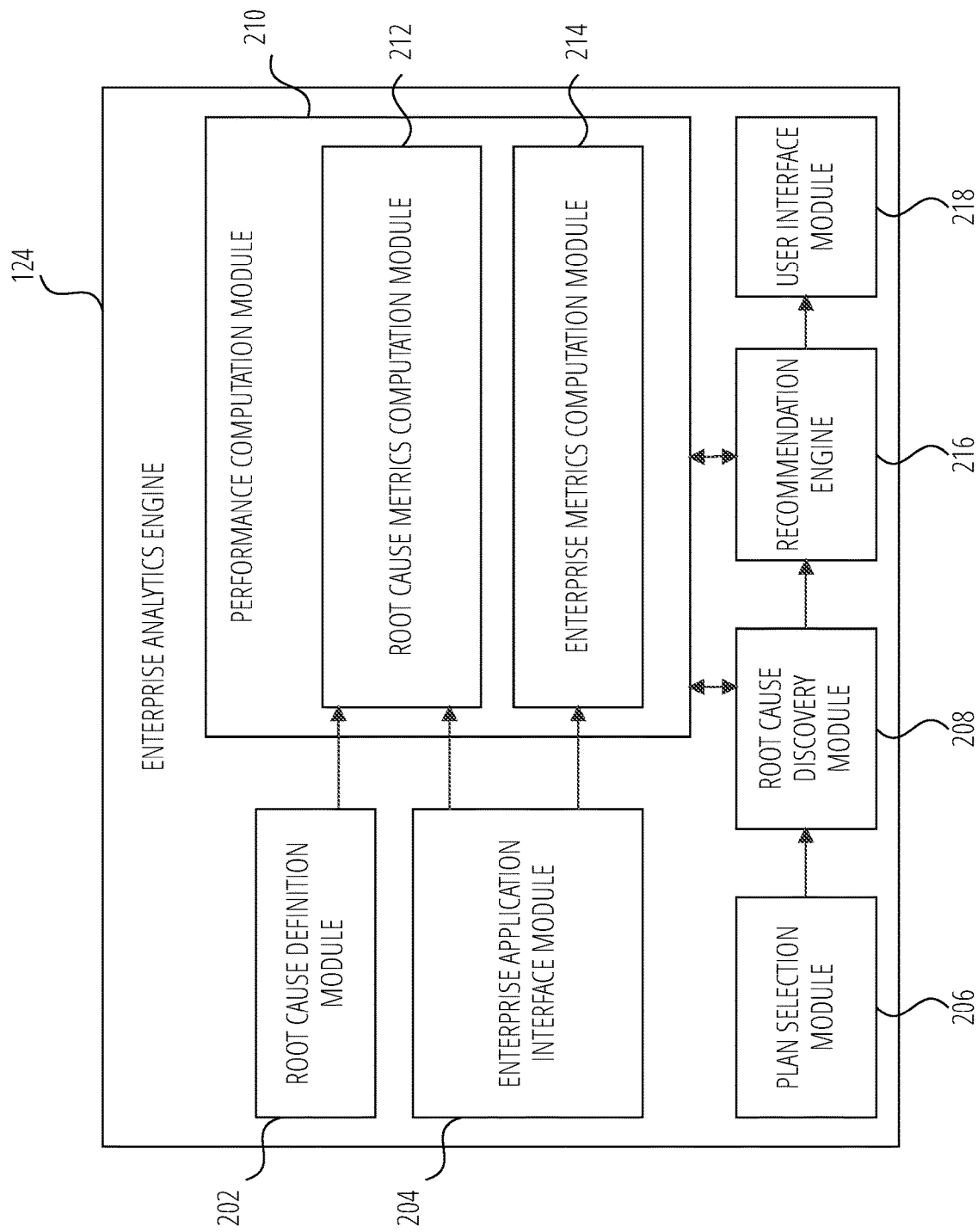
FIG. 2 is a block diagram illustrating an enterprise analysis engine in accordance with one example embodiment.

FIG. 2 is a block diagram illustrating an enterprise analysis engine in accordance with one example embodiment. The enterprise analytics engine 124 comprises a root cause definition module 202, an enterprise application interface module 204, a plan selection module 206, a root cause discovery module 208, a performance computation module 210, a root cause metrics computation module 212, an enterprise metrics computation module 214, a recommendation engine 216, and a user interface module 218.

The root cause definition module 202 receives a root cause definition from a client device 106 of the user 130 (e.g., an administrator of the enterprise analytics engine 124, a user of the enterprise application 122, or other users in the enterprise). For example, the client device 106 provides a root cause definition that indicates metrics for a plan (e.g., reduce work activities after hours). For example, the root cause definition module 202 receives a root cause definition for "AfterHoursCollaboration" root cause. The "AfterHoursCollaboration" root cause definition includes, for example, a number of meetings, chats, or emails after hours (e.g., after 5 pm and before 8 am) by users of the enterprise application 122. The root cause definition module 202 generates a root cause definition that indicates metrics (and parameters) related to the number of meetings, chats, or emails after hours (e.g., after 5 pm and before 8 am) by users of the enterprise application 122. Examples of metrics include number and frequency of meetings. Examples of parameters include more than two meetings after 5 pm and before 8 am, between 5 and 10 emails after hours less than three times a week.

Once the root cause definition is formed at the root cause definition module 202, the root cause definition module 202 communicates the root cause definition to the performance computation module 210. The performance computation module 210 includes for example, an analytics service (e.g., Azure Analysis Services of Microsoft™) that accesses the library of root cause definition to process the metrics associated with the root cause definitions. For example, a client device can query the performance computation module 210 to request different insights (e.g., analytics) based on any combination of metrics.

The enterprise application interface module 204 interfaces with the enterprise application 122 and accesses data metrics from the enterprise application 122 based on the operation or utilization of the enterprise application 122 by users of the enterprise. In one example, the enterprise application interface module 204 provides operations metadata of the enterprise application 122 by client device 106 to performance computation module 210. In another example, the enterprise application interface module 204 provides operations metadata of the enterprise application 122 to root cause metrics computation module 212 and enterprise metrics computation module 214. In another example, enterprise application interface module 204 communicates with a third-party database (e.g., third-party server 112) that stores periodically updated profiles of the enterprises (e.g., enterprise size, revenue, industry, etc.). In one example embodiment, the enterprise application interface module 204 retrieves the periodically updated profiles data from the third-party server 112. Other examples of metrics obtained by the enterprise application interface module 204 include revenue, industry classification, and size classification. By knowing the metrics, industry classification and size classification, the root cause metrics computation module 212 can generate benchmarks by grouping the companies based on the combinations of industry classification and size classification. If there is an industry and size combination that does not meet the minimum group size, then no benchmark is generated for that combination.

The performance computation module 210 includes root cause metrics computation module 212 and enterprise metrics computation module 214. The performance computation module 210 computes a performance of how the enterprise operates by determining a performance of enterprise users' operations of the enterprise application 122. For example, the performance computation module 210 analyzes habits, patterns, or trends of the enterprise users by accessing metadata related to date, times, frequency of communications, types of communications of the enterprise users. The root cause metrics computation module 212 accesses metrics data (e.g., from operation data of enterprise application 122) based on the root cause definition provided by the root cause definition module 202. The root cause metrics computation module 212 identifies the metrics corresponding to the root cause definition and accesses the metrics data with the enterprise application interface module 204. In one example, the root cause metrics computation module 212 stores the root cause definition in a library of root causes in databases 128.

The enterprise metrics computation module 214 computes other metrics not defined by the root cause definition. For example, the enterprise metrics computation module 214 computes a number of emails read by users after hours or other metrics not indicated by root cause definitions from root cause definition module 202.

The plan selection module 206 receives a selection of a plan from a client device 106 of the user 130 (e.g., an administrator of the enterprise analytics engine 124, a user of the enterprise application 122, or other users in the enterprise). The plan indicates an operation attribute (e.g., afterhours email usage) of the enterprise application 122. The plan selection module 206 provides the plan to the root cause discovery module 208.

The root cause discovery module 208 identifies a root cause (from the library of root causes) based on root cause definitions that correspond to the plan. For example, the root cause discovery module 208 identifies a root cause definition having metrics corresponding to the afterhours email usage. The root cause discovery module 208 computes metrics for a control group and an active group to determine whether a trait or feature of the active group can be improved.

The recommendation engine 216 generates a recommendation based on the identified root cause. For example, the recommendation engine 216 suggests that a user group (active group) of the enterprise refrain from emailing between midnight and 6 am on weekdays. The recommendation engine 216 generates a function call to an application (e.g., email application) corresponding to the suggestion selected by the user. For example, if the user accepts the email parameters suggested by the recommendation engine 216, the recommendation engine 216 launches the email application at the client device of the user and configures the email application with the suggested parameters.

The user interface module 218 generates a graphical user interface that indicates the metrics of the active group in relation to metrics from peer groups based on the recommendation from the recommendation engine 216.

Figure 3:
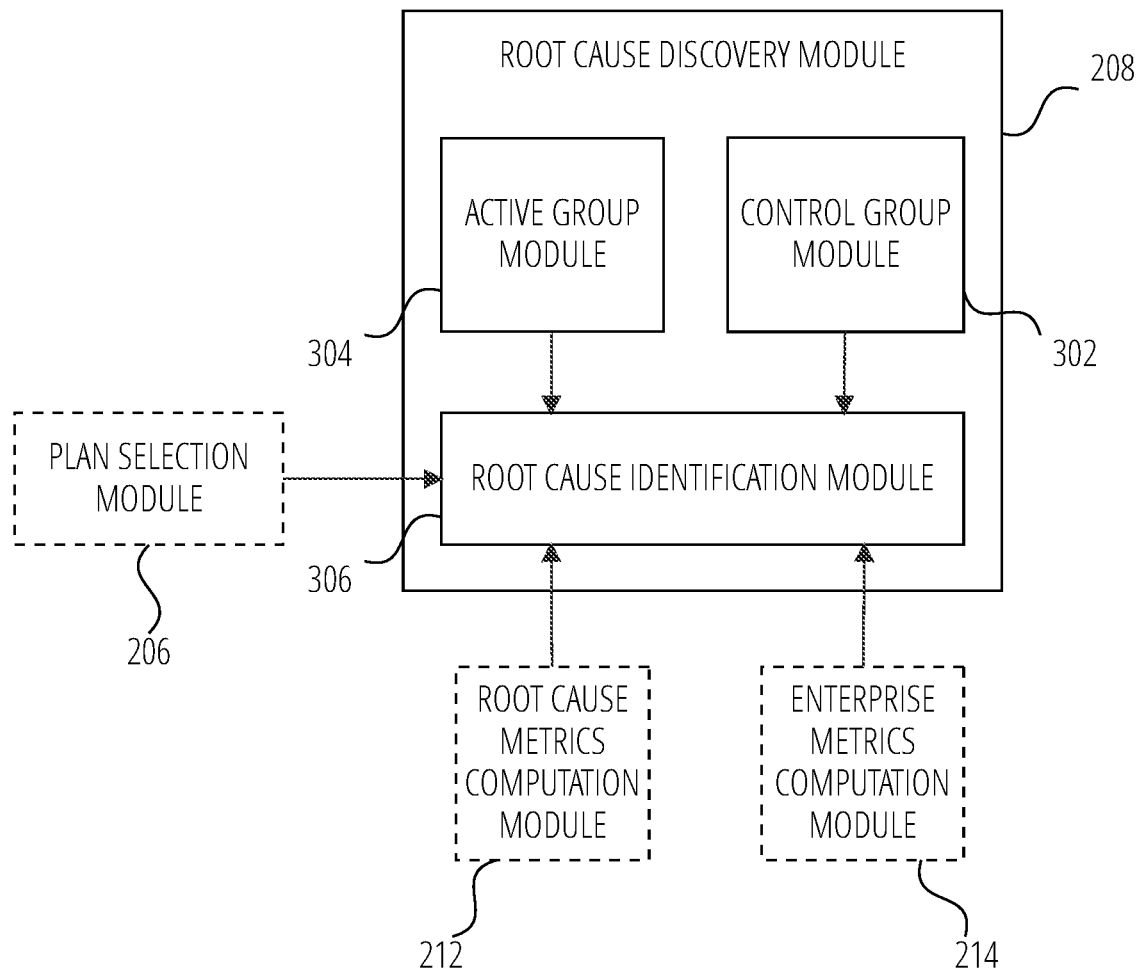
FIG. 3 illustrates a root cause discovery module in accordance with one example embodiment.

FIG. 3 illustrates a root cause discovery module in accordance with one example embodiment. The root cause discovery module 208 comprises a control group module 302, an active group module 304, and a root cause identification module 306. The active group module 304 identifies metrics data related to users of an active group or a selected group (e.g., users from an accounting department of the enterprise, or enterprise users with a common profile—software engineers). The metrics data of the active group are identified and computed by the root cause metrics computation module 212 and enterprise metrics computation module 214. The control group module 302 identifies metrics data related to users of a peer group or a control group (e.g., users from a similar accounting department in a different branch of the enterprise, or enterprise users with a common profile—software engineers but at a different geographic location). The metrics data of the control group are identified and computed by the root cause metrics computation module 212 and enterprise metrics computation module 214.

The root cause identification module 306 identifies a root cause based on the plan identified by the plan selection module 206, the root cause metrics identified by the root cause metrics computation module 212, and the enterprise metrics identified by the enterprise metrics computation module 214 with a comparison of the metrics data from the active group and the control group.

Figure 4:
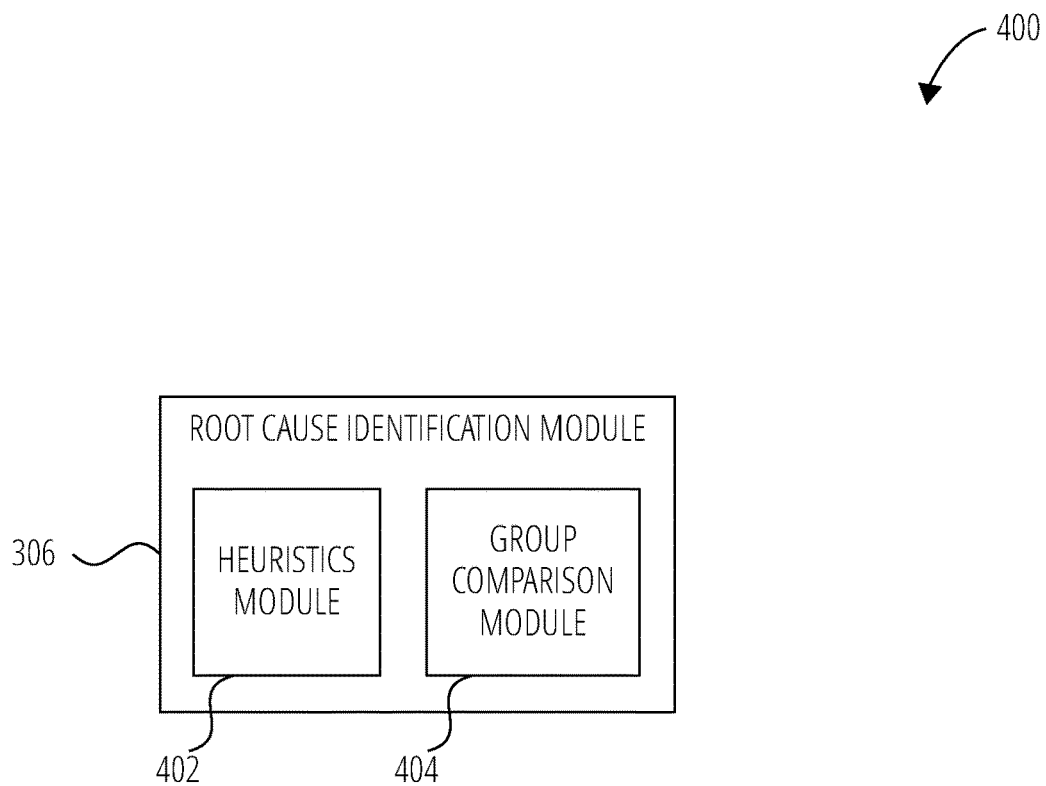
FIG. 4 illustrates a root cause identification module in accordance with one example embodiment.

FIG. 4 illustrates a root cause identification module in accordance with one example embodiment. In one example, the root cause identification module 306 includes a heuristics module 402 and a group comparison module 404. The heuristics module 402 includes, for example, a static mapping engine or a machine learning model to determine which root causes fit well with the selected plan and would boost a trait of a user group (e.g., a productivity of a user group as measured by metrics defined in the root cause).

The group comparison module 404 compares metrics data corresponding to the root cause identified with the heuristics module 402 for the active group and the control group. In one example, the group comparison module 404 identifies a trait of the active group that can be improved relative to the trait of the control group. For example, group comparison module 404 determines that a trait can be improved if a metric data of the trait of the active group is within two standard deviation of the metric data of the trait of the control group.

Figure 5:
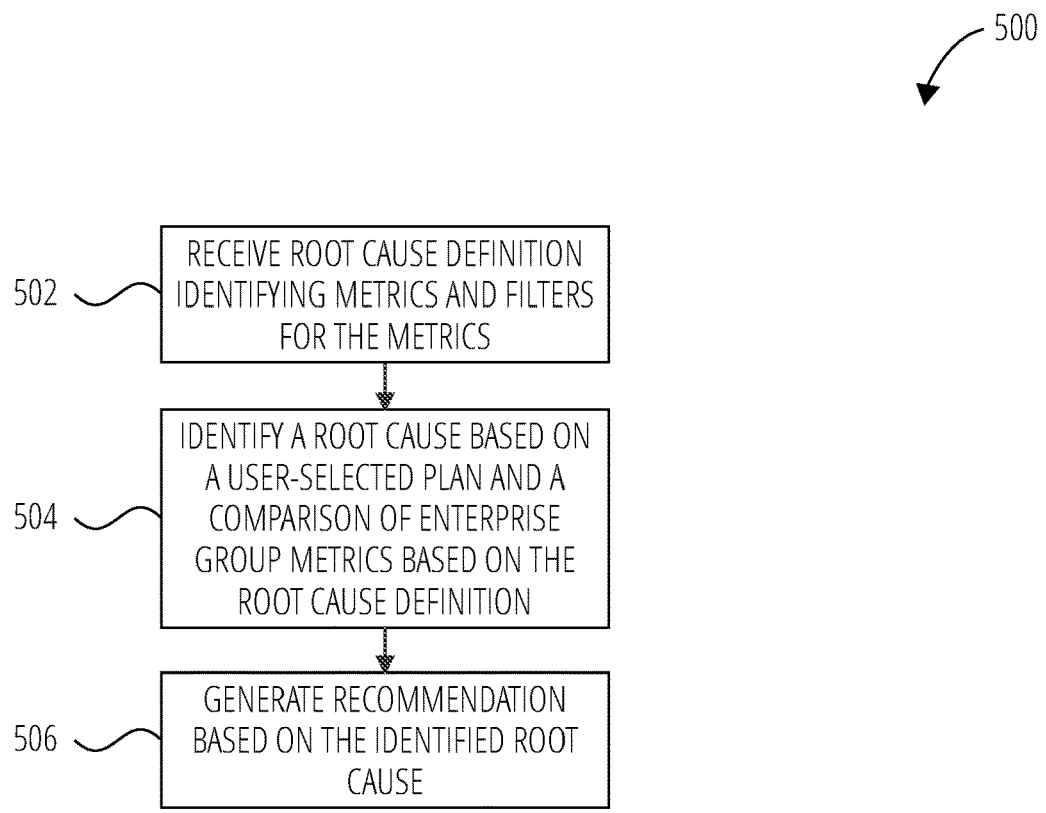
FIG. 5 is a flow diagram illustrating a method for generating a recommendation based on an identified root cause in accordance with one example embodiment.

FIG. 5 is a flow diagram illustrating a method 500 for computing collaboration strength metrics in accordance with one example embodiment. Operations in the method 500 may be performed by the enterprise analytics engine 124, using components (e.g., modules, engines) described above with respect to FIG. 2. Accordingly, the method 500 is described by way of example with reference to the enterprise analytics engine 124. However, it shall be appreciated that at least some of the operations of the method 500 may be deployed on various other hardware configurations or be performed by similar components residing elsewhere. For example, some of the operations may be performed at the client device 106.

At block 502, the enterprise analytics engine 124 receives a root cause definition that identifies metrics and filters for the metrics (e.g., boundary parameters for the metrics). At block 504, the enterprise analytics engine 124 identifies a root cause based on a user-selected plan and a comparison of enterprise group metrics based on the root cause definition. At block 506, the enterprise analytics engine 124 generates a recommendation based on the identified root cause.

Figure 6:
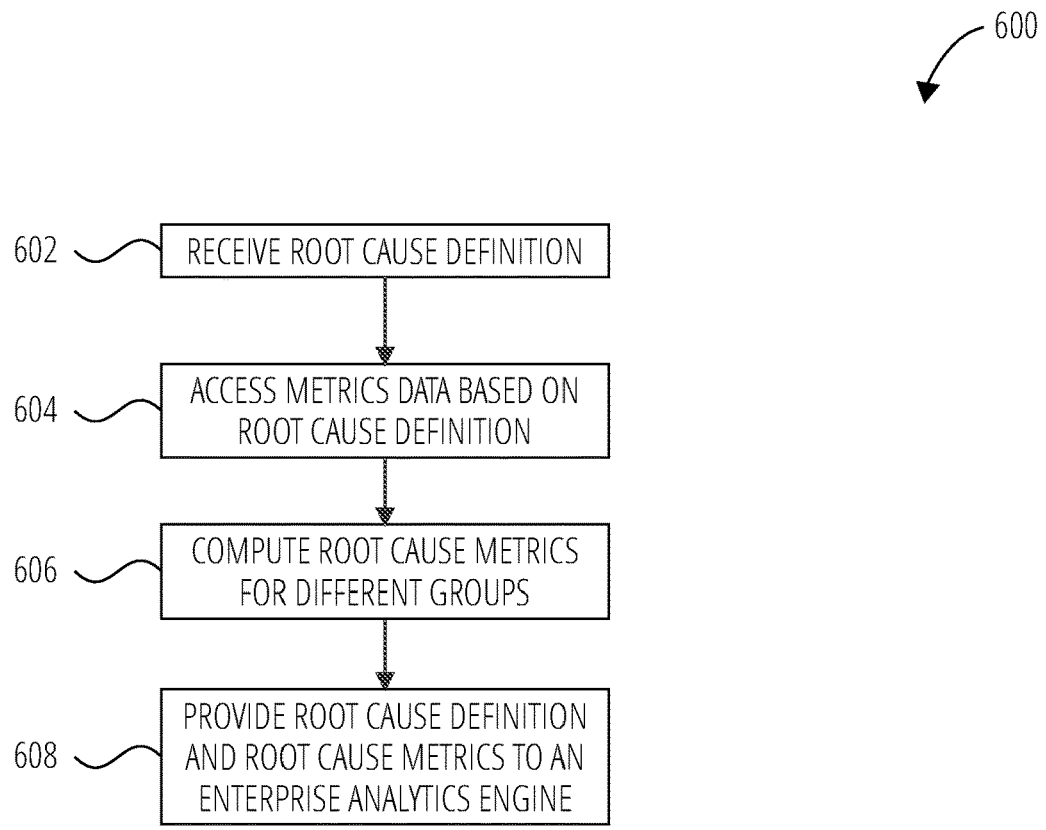
FIG. 6 is a flow diagram illustrating a method for authoring a root cause definition in accordance with one example embodiment.

FIG. 6 is a flow diagram illustrating a method 600 for computing collaboration strength metrics in accordance with one example embodiment. Operations in the method 600 may be performed by the enterprise analytics engine 124, using components (e.g., modules, engines) described above with respect to FIG. 2. Accordingly, the method 600 is described by way of example with reference to the enterprise analytics engine 124. However, it shall be appreciated that at least some of the operations of the method 600 may be deployed on various other hardware configurations or be performed by similar components residing elsewhere. For example, some of the operations may be performed at the client device 106.

At block 602, the enterprise analytics engine 124 receives a root cause definition. At block 604, the enterprise analytics engine 124 accesses metrics data based on the root cause definition. At block 606, the enterprise analytics engine 124 computes root cause metrics for different groups. At block 608, the root cause definition and root cause metrics is provided to the enterprise analytics engine 124.

Figure 7:
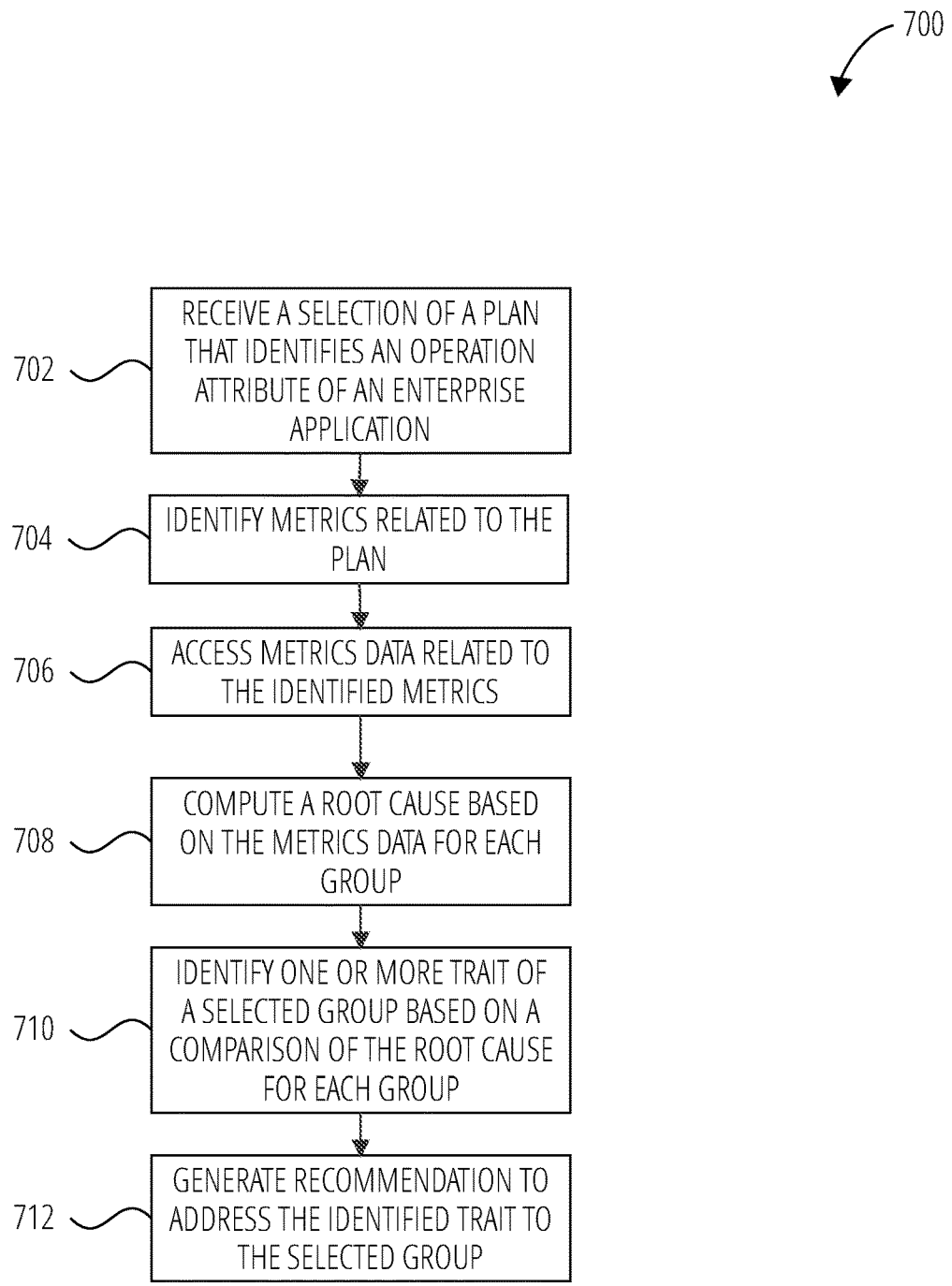
FIG. 7 is a flow diagram illustrating a method for generating a recommendation in accordance with one example embodiment.

FIG. 7 is a flow diagram illustrating a method 700 for computing collaboration strength metrics in accordance with one example embodiment. Operations in the method 700 may be performed by the enterprise analytics engine 124, using components (e.g., modules, engines) described above with respect to FIG. 2. Accordingly, the method 700 is described by way of example with reference to the enterprise analytics engine 124. However, it shall be appreciated that at least some of the operations of the method 700 may be deployed on various other hardware configurations or be performed by similar components residing elsewhere. For example, some of the operations may be performed at the client device 106.

At block 702, the plan selection module 206 receives a selection of a plan from a user. The plan identifies an operation attribute of the enterprise application 122. At block 704, the performance computation module 210 identifies metrics related to the plan. At block 706, the root cause metrics computation module 212 accesses metrics data related to the identified metrics. At block 708, the root cause discovery module 208 identifies a root cause based on the metrics data for each group. At block 710, the root cause discovery module 208 identifies one or more trait of a selected group based on a comparison of the root cause for each group. At block 712, the recommendation engine 216 generates a recommendation to address the identified trait to the selected group.

Figure 8:
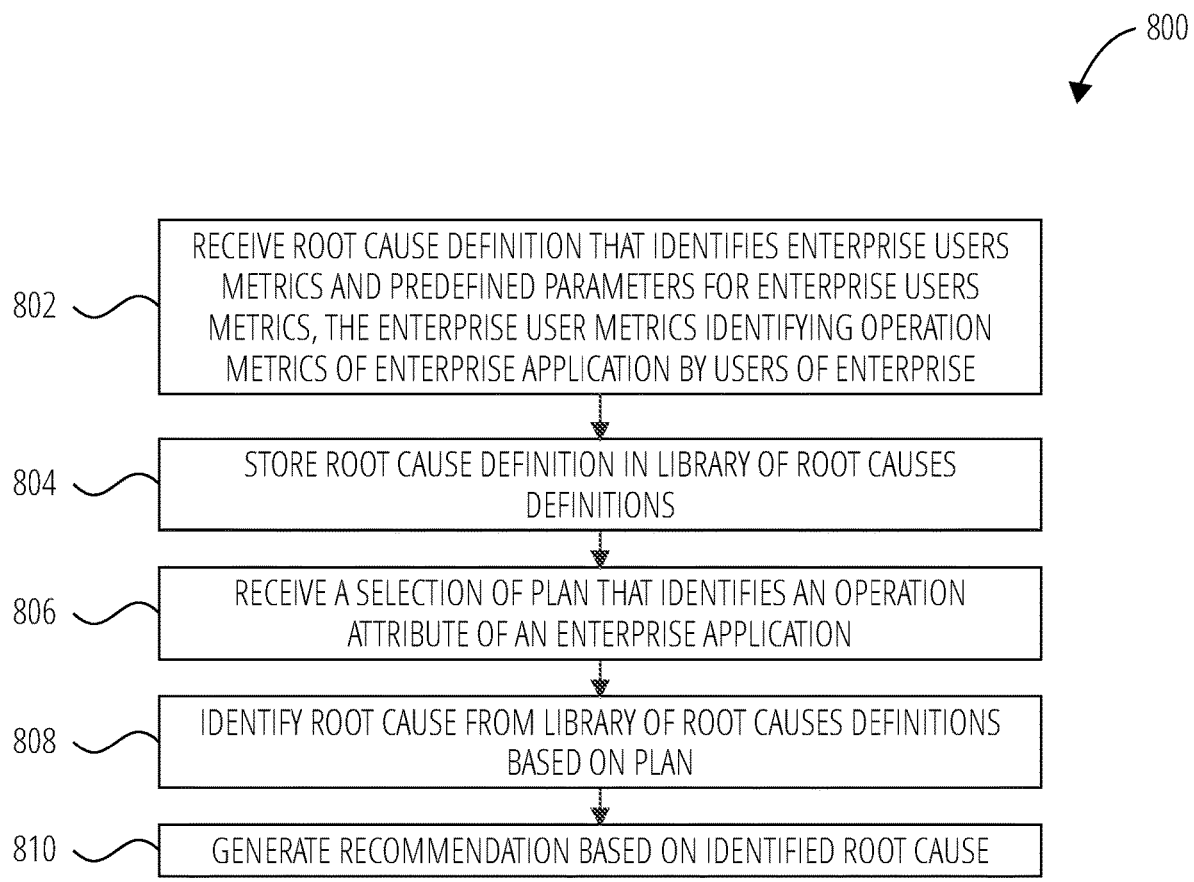
FIG. 8 is a flow diagram illustrating a routine in accordance with one example embodiment.

FIG. 8 is a flow diagram illustrating a routine in accordance with one example embodiment. In block 802, item 800 receives a root cause definition that identifies enterprise user metrics and predefined parameters for the enterprise user metrics, the enterprise user metrics identifying operation metrics of an enterprise application by users of an enterprise. In block 804, item 800 stores the root cause definition in a library of root causes definitions. In block 806, item 800 receives a selection of a plan that identifies an operation attribute of the enterprise application. In block 808, item 800 identifies a root cause from the library of root causes definitions based on the plan. In block 810, item 800 generates a recommendation based on the identified root cause.

Figure 9:
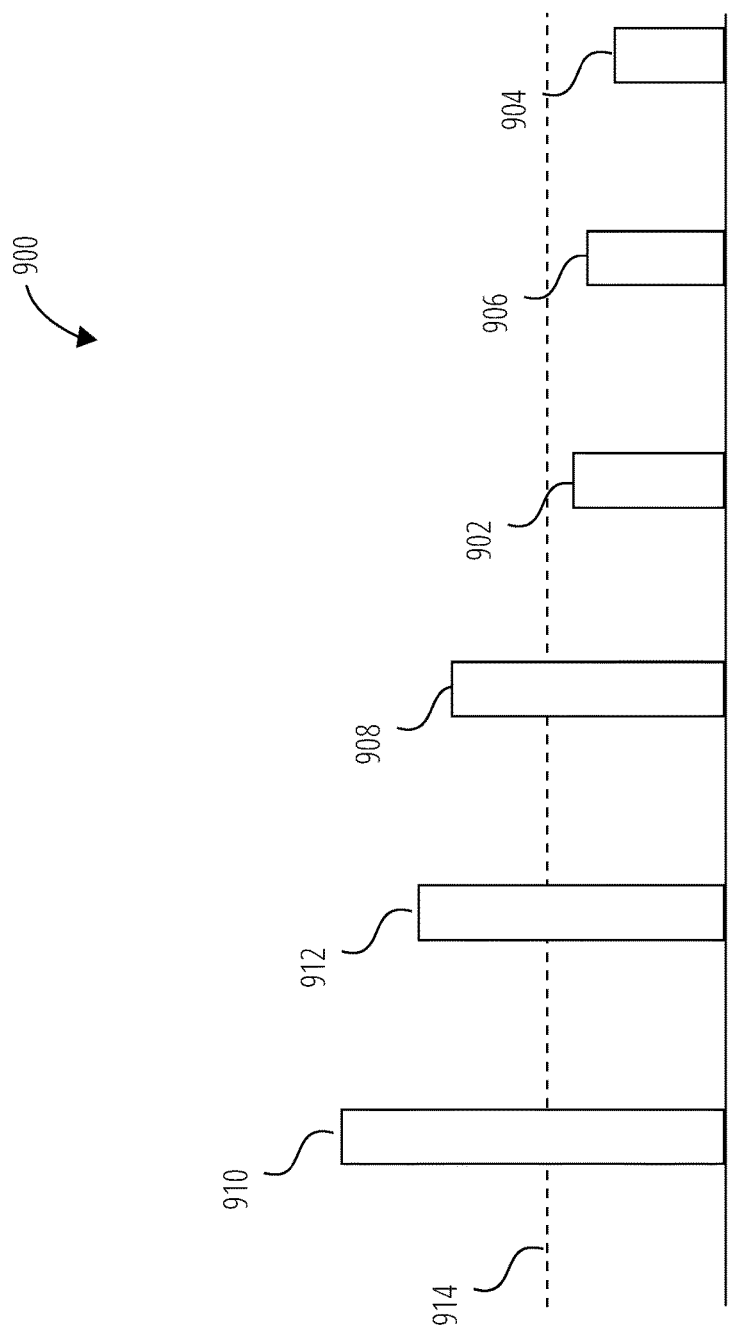
FIG. 9 illustrates an example of a graphical user interface of a recommendation in accordance with one example embodiment.

FIG. 9 illustrates an example of a graphical user interface 900 of a recommendation in accordance with one example embodiment. The after-hours collaboration metric for different groups (peer group 910, peer group 912, peer group 908, active group 902, peer group 906, peer group 904) are depicted in a graph. The graphical user interface 900 depicts the average peer metric 914 (e.g., after-hours work).

Figure 10:
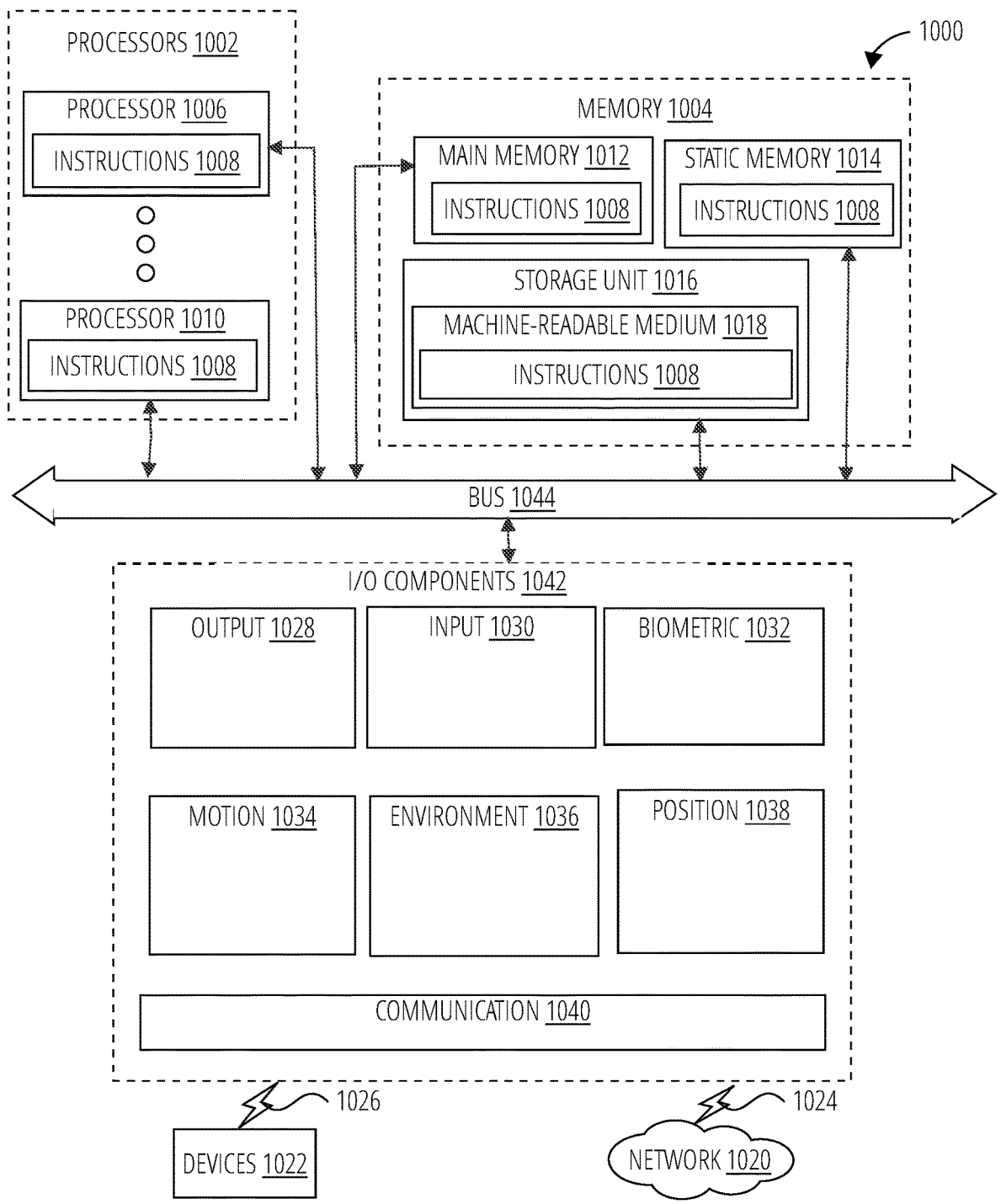
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Examples

Example 1 is a computer-implemented method comprising: receiving a root cause definition that identifies enterprise user metrics and predefined parameters for the enterprise user metrics, the enterprise user metrics identifying operation metrics of an enterprise application by users of an enterprise; storing the root cause definition in a library of root causes definitions; receiving a selection of a plan that identifies an operation attribute of the enterprise application; identifying a root cause from the library of root causes definitions based on the plan; and generating a recommendation based on the identified root cause.

Example 2 is the computer-implemented method of example 1, wherein identifying the root cause further comprises: providing the root cause definition to an enterprise performance analytics engine; accessing enterprise group metrics based on the root cause definition for a plurality of groups of the enterprise, the plurality of groups comprising an active group and a control group; comparing the enterprise group metrics for the active group with the enterprise group metrics of the control group; and identifying a trait of the active group based on the comparing, wherein the recommendation indicates the identified trait of the active group relative to a trait of the control group, wherein the identified trait corresponds to the operation attribute of the enterprise.

Example 3 is the computer-implemented method of example 1, further comprising: computing performance metrics of the enterprise with an enterprise performance analytics engine; computing enterprise group metrics for each enterprise group based on the performance metrics; and identifying the root cause corresponding to the plan based a comparison of the enterprise group metrics for each enterprise group.

Example 4 is the computer-implemented method of example 3, further comprising: identifying a user-selected enterprise group; comparing the enterprise group metrics of the user-selected enterprise group with the enterprise group metrics of each enterprise group, each enterprise group having similar characteristics with the user-selected enterprise group; identifying a trait of the user-selected enterprise group that is anomalous in comparison to the same trait for each enterprise group, wherein the recommendation is based on the identified trait of the user-selected group.

Example 5 is the computer-implemented method of example 4, further comprising: communicating a reminder to the users of the user-selected group based on the recommendation, the reminder indicating that the trait is anomalous.

Example 6 is the computer-implemented method of example 4, further comprising: periodically communicating the reminder to the users of the user-selected group until the trait is determined to be no longer anomalous.

Example 7 is the computer-implemented method of example 1, further comprising: accessing metrics data based on the root cause definition; computing the root cause metrics for a plurality of enterprise groups; providing the root cause definition and the computed root cause metrics to an enterprise performance analytics engine; and using the enterprise performance analytics engine to generate the recommendation based on the root cause definition and the computed root cause metrics.

Example 8 is the computer-implemented method of example 1, further comprising: identifying a plurality of enterprise operation metrics corresponding to the operation attribute of the enterprise; accessing enterprise operation metrics data for the plurality of enterprise operation metrics; and determining the root cause based on the enterprise operation metrics data for each enterprise group.

Example 9 is the computer-implemented method of example 8, further comprising: comparing the root cause for each enterprise group; identifying a trait based on the comparing; and generating the recommendation on the identified trait.

Example 10 is the computer-implemented method of example 1, further comprising: accessing the operation metrics of the enterprise application by a plurality of users of the enterprise; identifying the root cause based on the operation metrics and the root cause definition for each user group of the enterprise; and using the root cause definition to form an enterprise performance metric that is accessible by one or more of the plurality of users of the enterprise application.

What is claimed is:

1. A computer-implemented method comprising:
   receiving a root cause definition that identifies enterprise user metrics and predefined parameters for the enterprise user metrics, the enterprise user metrics identifying operation metrics of an enterprise application by users of an enterprise;
   storing the root cause definition in a library of root causes definitions;
   receiving a selection of a plan that identifies an operation attribute of the enterprise application;
   identifying a root cause from the library of root causes definitions based on the plan;
   generating a recommendation based on the identified root cause;
   accessing the operation metrics of the enterprise application by a plurality of users of the enterprise;
   identifying the root cause based on the operation metrics and the root cause definition for each user group of the enterprise; and
   using the root cause definition to form an enterprise performance metric that is accessible by one or more of the plurality of users of the enterprise application.

2. The computer-implemented method of claim 1, wherein identifying the root cause further comprises:
   providing the root cause definition to an enterprise performance analytics engine;
   accessing enterprise group metrics based on the root cause definition for a plurality of groups of the enterprise, the plurality of groups comprising an active group and a control group;
   comparing the enterprise group metrics for the active group with the enterprise group metrics of the control group; and
   identifying a trait of the active group based on the comparing, wherein the recommendation indicates the identified trait of the active group relative to a trait of the control group, wherein the identified trait corresponds to the operation attribute of the enterprise.

3. The computer-implemented method of claim 1, further comprising:
   computing performance metrics of the enterprise with an enterprise performance analytics engine;
   computing enterprise group metrics for each enterprise group based on the performance metrics; and
   identifying the root cause corresponding to the plan based a comparison of the enterprise group metrics for each enterprise group.

4. The computer-implemented method of claim 3, further comprising:
   identifying a user-selected enterprise group;
   comparing the enterprise group metrics of the user-selected enterprise group with the enterprise group metrics of each enterprise group, each enterprise group having similar characteristics with the user-selected enterprise group;
   identifying a trait of the user-selected enterprise group that is anomalous in comparison to the same trait for each enterprise group,
   wherein the recommendation is based on the identified trait of the user-selected group.

5. The computer-implemented method of claim 4, further comprising:
   communicating a reminder to the users of the user-selected group based on the recommendation, the reminder indicating that the trait is anomalous.

6. The computer-implemented method of claim 4, further comprising:
   periodically communicating the reminder to the users of the user-selected group until the trait is determined to be no longer anomalous.

7. The computer-implemented method of claim 1, further comprising:
   accessing metrics data based on the root cause definition;
   computing the root cause metrics for a plurality of enterprise groups;
   providing the root cause definition and the computed root cause metrics to an enterprise performance analytics engine; and
   using the enterprise performance analytics engine to generate the recommendation based on the root cause definition and the computed root cause metrics.

8. The computer-implemented method of claim 1, further comprising:
   identifying a plurality of enterprise operation metrics corresponding to the operation attribute of the enterprise;
   accessing enterprise operation metrics data for the plurality of enterprise operation metrics; and
   determining the root cause based on the enterprise operation metrics data for each enterprise group.

9. The computer-implemented method of claim 8, further comprising:
   comparing the root cause for each enterprise group;
   identifying a trait based on the comparing; and
   generating the recommendation on the identified trait.

10. A computing apparatus, the computing apparatus comprising:
    a processor; and
    a memory storing instructions that, when executed by the processor, configure the computing apparatus to:
       receive a root cause definition that identifies enterprise user metrics and predefined parameters for the enterprise user metrics, the enterprise user metrics identifying operation metrics of an enterprise application by users of an enterprise;
       store the root cause definition in a library of root causes definitions;
       receive a selection of a plan that identifies an operation attribute of the enterprise application;
       identify a root cause from the library of root causes definitions based on the plan;
       generate a recommendation based on the identified root cause;
       access the operation metrics of the enterprise application by a plurality of users of the enterprise;
       identify the root cause based on the operation metrics and the root cause definition for each user group of the enterprise; and
       use the root cause definition to form an enterprise performance metric that is accessible by one or more of the plurality of users of the enterprise application.

11. The computing apparatus of claim 10, wherein identifying the root cause further comprises:
    provide the root cause definition to an enterprise performance analytics engine;
    access enterprise group metrics based on the root cause definition for a plurality of groups of the enterprise, the plurality of groups comprising an active group and a control group;
    compare the enterprise group metrics for the active group with the enterprise group metrics of the control group; and identify a trait of the active group based on the comparing, wherein the recommendation indicates the identified trait of the active group relative to a trait of the control group, wherein the identified trait corresponds to the operation attribute of the enterprise.

12. The computing apparatus of claim 10, wherein the instructions further configure the apparatus to:
compute performance metrics of the enterprise with an enterprise performance analytics engine;
compute enterprise group metrics for each enterprise group based on the performance metrics; and
identify the root cause corresponding to the plan based a comparison of the enterprise group metrics for each enterprise group.

13. The computing apparatus of claim 12, wherein the instructions further configure the apparatus to:
identify a user-selected enterprise group;
compare the enterprise group metrics of the user-selected enterprise group with the enterprise group metrics of each enterprise group, each enterprise group having similar characteristics with the user-selected enterprise group;
identify a trait of the user-selected enterprise group that is anomalous in comparison to the same trait for each enterprise group,
wherein the recommendation is based on the identified trait of the user-selected group.

14. The computing apparatus of claim 13, wherein the instructions further configure the apparatus to:
communicate a reminder to the users of the user-selected group based on the recommendation, the reminder indicating that the trait is anomalous.

15. The computing apparatus of claim 13, wherein the instructions further configure the apparatus to:
periodically communicate the reminder to the users of the user-selected group until the trait is determined to be no longer anomalous.

16. The computing apparatus of claim 10, wherein the instructions further configure the apparatus to:
access metrics data based on the root cause definition;
compute the root cause metrics for a plurality of enterprise groups;
provide the root cause definition and the computed root cause metrics to an enterprise performance analytics engine; and
use the enterprise performance analytics engine to generate the recommendation based on the root cause definition and the computed root cause metrics.

17. The computing apparatus of claim 10, wherein the instructions further configure the apparatus to:
identify a plurality of enterprise operation metrics corresponding to the operation attribute of the enterprise;
access enterprise operation metrics data for the plurality of enterprise operation metrics; and
determine the root cause based on the enterprise operation metrics data for each enterprise group.

18. The computing apparatus of claim 17, wherein the instructions further configure the apparatus to:
compare the root cause for each enterprise group;
identify a trait based on the comparing; and
generate the recommendation on the identified trait.

19. A non-transitory computer-readable storage medium, the computer-readable storage medium including instructions that when executed by a computer, cause the computer to:
receive a root cause definition that identifies enterprise user metrics and predefined parameters for the enterprise user metrics, the enterprise user metrics identifying operation metrics of an enterprise application by users of an enterprise;
store the root cause definition in a library of root causes definitions;
receive a selection of a plan that identifies an operation attribute of the enterprise application;
identify a root cause from the library of root causes definitions based on the plan;
generate a recommendation based on the identified root cause;
access the operation metrics of the enterprise application by a plurality of users of the enterprise;
identify the root cause based on the operation metrics and the root cause definition for each user group of the enterprise; and
use the root cause definition to form an enterprise performance metric that is accessible by one or more of the plurality of users of the enterprise application.

* * * * *